(12) United States Patent
Kurihara

(10) Patent No.: US 10,358,087 B2
(45) Date of Patent: Jul. 23, 2019

(54) LAMINATED GLASS AND VEHICULAR DISPLAY DEVICE

(71) Applicant: AGC Inc., Chiyoda-ku (JP)

(72) Inventor: Kazuyuki Kurihara, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 148 days.

(21) Appl. No.: 15/041,630

(22) Filed: Feb. 11, 2016

(65) Prior Publication Data

US 2016/0159282 A1 Jun. 9, 2016

Related U.S. Application Data

(63) Continuation of application No. PCT/JP2014/073829, filed on Sep. 9, 2014.

(30) Foreign Application Priority Data

Sep. 18, 2013 (JP) ................. 2013-192768

(51) Int. Cl.
*B60J 1/00* (2006.01)
*B60R 1/00* (2006.01)
(Continued)

(52) U.S. Cl.
CPC .......... *B60R 1/00* (2013.01); *B32B 17/10036* (2013.01); *B32B 17/10541* (2013.01);
(Continued)

(58) Field of Classification Search
CPC ....... C03C 27/06; B60R 1/00; B60R 11/0235; B60R 2300/205; B60R 2011/0026;
(Continued)

(56) References Cited

U.S. PATENT DOCUMENTS 1,766,055 A * 6/1930 Clement ................ B60J 1/2011
160/369
2,409,808 A * 10/1946 Sowle .................. B64C 1/1492
52/204.595
(Continued)

FOREIGN PATENT DOCUMENTS

CN 101893761 A 11/2010
CN 202806307 U 3/2013
(Continued)

OTHER PUBLICATIONS

International Search Report dated Dec. 2, 2014 in PCT/JP2014/073829 filed Sep. 9, 2014.

*Primary Examiner* — Sathyanaraya V Perungavoor
*Assistant Examiner* — Phillip P. Dang
(74) *Attorney, Agent, or Firm* — Oblon, McClelland, Maier & Neustadt, L.L.P.

(57) ABSTRACT

There is provided laminated glass including a display suited to windshield glass.
The laminated glass 30 according to the present invention is configured by bonding, through substantially rectangular interlayers 16, 18 and 20, a substantially rectangular glass plate 12 and a substantially rectangular glass plate 14, which have the same sizes as each other. The laminated glass 30 has a plurality of rectangular organic EL displays 34, 36 and 38 as displays built at certain positions in the laminated glass 30. In other words, the laminated glass 30 according to the present invention suited to windshield glass is configured by interposing the organic EL displays 34, 36 and 38 between the interlayer 16 and the interlayer 20 disposed between the glass plate 12 and the glass plate 14.

13 Claims, 7 Drawing Sheets

(51) Int. Cl.
*B60J 1/02* (2006.01)
*C03C 27/06* (2006.01)
*B60R 11/02* (2006.01)
*B32B 17/10* (2006.01)
*G02B 27/01* (2006.01)
*B60R 11/00* (2006.01)

(52) U.S. Cl.
CPC .......... *B32B 17/10761* (2013.01); *B60J 1/02* (2013.01); *B60R 11/0235* (2013.01); *C03C 27/06* (2013.01); *B60R 2011/0026* (2013.01); *B60R 2300/205* (2013.01); *B60R 2300/802* (2013.01); *G02B 27/01* (2013.01); *G02B 2027/0138* (2013.01); *G02B 2027/0194* (2013.01)

(58) Field of Classification Search
CPC ........ B60R 2300/802; B32B 17/10541; B32B 17/10036; B32B 17/10761; B60J 1/02; G02B 2027/0138; G02B 2027/0194; G02B 27/01
See application file for complete search history.

(56) References Cited

U.S. PATENT DOCUMENTS

| | | | | |
|---|---|---|---|---|
| 4,624,731 A * | 11/1986 | Ash | | B29C 43/56 156/104 |
| 5,153,751 A * | 10/1992 | Ishikawa | | G02B 27/0103 359/13 |
| 5,469,184 A * | 11/1995 | Mount | | G02B 27/01 340/441 |
| 5,667,897 A * | 9/1997 | Hashemi | | B28D 1/00 156/106 |
| 5,772,862 A * | 6/1998 | Ando | | B32B 17/10174 204/298.13 |
| 6,326,900 B2 * | 12/2001 | DeLine | | B60K 35/00 340/425.5 |
| 6,507,436 B2 * | 1/2003 | Nishikawa | | G02B 5/3066 156/99 |
| 7,276,263 B2 * | 10/2007 | Kimura | | C03C 1/008 427/162 |
| 7,963,660 B2 * | 6/2011 | Hamamoto | | G02F 1/133502 359/601 |
| 8,097,113 B2 * | 1/2012 | Moeyersons | | B32B 17/10036 156/285 |
| 8,102,586 B2 * | 1/2012 | Albahri | | B60J 3/04 359/265 |
| 8,154,418 B2 * | 4/2012 | Peterson | | B60R 1/12 340/815.4 |
| 8,292,684 B2 * | 10/2012 | Kim | | C03C 8/24 313/512 |
| 8,350,726 B2 * | 1/2013 | Mathan | | G01C 23/005 340/947 |
| 8,406,466 B2 * | 3/2013 | He | | G01C 23/00 340/988 |
| 8,487,787 B2 * | 7/2013 | Best | | G02B 27/0093 340/933 |
| 2001/0003439 A1 * | 6/2001 | DeLine | | B60K 35/00 340/815.4 |
| 2002/0048058 A1 * | 4/2002 | Nishikawa | | G02B 27/0018 359/15 |
| 2003/0150848 A1 | 8/2003 | Noguchi et al. | | |
| 2007/0146598 A1 * | 6/2007 | Yokokawa | | G02F 1/1337 349/123 |
| 2007/0211335 A1 * | 9/2007 | Ikeda | | G02B 5/305 359/487.05 |
| 2009/0303581 A1 | 12/2009 | Matsushita et al. | | |
| 2010/0122782 A1 * | 5/2010 | Fox | | B60J 1/20 160/370.21 |
| 2010/0253597 A1 | 10/2010 | Seder et al. | | |
| 2011/0025584 A1 | 2/2011 | Nishigasako et al. | | |
| 2011/0193725 A1 * | 8/2011 | Wise | | G01C 23/005 340/974 |
| 2011/0293857 A1 * | 12/2011 | Fukatani | | B32B 17/10458 428/1.33 |
| 2012/0140125 A1 * | 6/2012 | Pepitone | | G02B 27/0149 348/794 |
| 2012/0314075 A1 * | 12/2012 | Cho | | B60R 1/00 348/148 |

FOREIGN PATENT DOCUMENTS

| | | |
|---|---|---|
| DE | 19708610 | 9/1998 |
| DE | 102011080154 | 1/2013 |
| EP | 1672588 | 6/2006 |
| JP | S58164914 | 11/1983 |
| JP | 5-16450 U | 3/1993 |
| JP | 3013662 U | 7/1995 |
| JP | 2003-211956 | 7/2003 |
| JP | 2006-347451 A | 12/2006 |
| JP | 2007-326526 | 12/2007 |
| JP | 2009-534246 | 9/2009 |
| JP | 2010-251230 | 11/2010 |
| JP | 2013-100229 | 5/2013 |
| JP | 2013-173671 | 9/2013 |
| WO | WO 2007/122427 | 11/2007 |
| WO | WO 2012/132897 A1 | 10/2012 |

* cited by examiner

LAMINATED GLASS AND VEHICULAR DISPLAY DEVICE

TECHNICAL FIELD

The present invention relates to laminated glass utilized as, in particular, windshield glass, and a vehicle display device utilizing the same.

BACKGROUND ART

A vehicle is equipped with a rear view mirror (inner rear view mirror), fender mirrors and door mirrors (outer rear view mirrors).

The current trends in a vehicle body design are to make a body streamlined or to mount a small-sized engine, such as an electric motor, on the body to make the bonnet compact. For this reason, it has become difficult to dispose fender mirrors on the body. The presence of body pillars make it difficult to make visual recognition allowable by use of door mirrors in some cases.

Patent Document 1 has proposed mounting a liquid crystal display (display) of a car navigation system on windshield glass (windscreen glass).

With regard to how to mount the liquid crystal display, Patent Document 1 has proposed that the liquid crystal display have a suction plate mounted on a rear side thereof so as to be directly attached to windshield glass, that the liquid crystal display have an arm attached as support to a rear side thereof like a rear view mirror so as to be fixed to windshield glass at an arm end, that the liquid crystal display have a top end fixed to windshield glass like a sun visor equipped on an automobile so as to be suspended from the windshield glass, that the liquid crystal display be embedded in a sun visor equipped on an automobile or the liquid crystal display have a rear side thereof bonded to or sucked onto a sun visor, and that the liquid crystal display be installed below windscreen.

According to Patent Document 1, the liquid crystal display of the car-navigation system is mounted on windshield glass such that a driver can not only watch the liquid crystal display but also see forward through the windshield glass even while driving, with the result that he or she can check a current location or a planned route during making safe drive.

PRIOR ART DOCUMENTS

Patent Documents

Patent Document 1: JP-Z-3013662

DISCLOSURE OF INVENTION

Technical Problem

Although the liquid crystal display according to Patent Document 1 is disposed on a surface area of windshield glass where a driver can easily make visual recognition, the liquid crystal display is a display that is disposed so as to protrude from a car-interior side of the windshield glass toward a car-interior side. By this arrangement, the liquid crystal display according to Patent Document 1 has been a disturbance to a driver or a passenger next to the driver in some cases.

The surface area referred to in Patent Document 1 means a surface area that is located in a visible area to a driver on the car-interior side of the windshield glass according to the above-mentioned attaching modes, but does not means the inside of the windshield glass.

The present invention has been proposed in consideration of such circumstances. The present invention has an object to provide laminated glass with a display equipped therein, which is suited to windshield glass, and a vehicle display device utilizing the same.

Solution to Problem

According to one mode of the present invention, in order to attain the object, there is provided laminated glass utilized as windshield glass for a vehicle, which includes at least two glass plates and an interlayer interposed therebetween, at least one display being interposed between the at least two glass plates, and the at least one display being disposed in a peripheral edge area of the laminated glass as seen from a car-interior side of the vehicle.

In accordance with this mode of the present invention, the display is disposed in the laminated glass, in other words, is built in the laminated glass such that the display does not protrude from the surface of the laminated glass. When the laminated glass is utilized as windshield glass, the display does not serve as a disturbance to a driver or a passenger. Thus, the laminated glass according to this mode of the present invention works as laminated glass including a display appropriate to a vehicle windshield glass.

It is preferred from the viewpoint of the display being built in the laminated glass that the interlayer be an interlayer made of an ethylene-vinyl acetate copolymer, which allows the laminated glass to be produced without treatment at a high temperature (treatment using an autoclave).

According to another mode of the present invention, it is preferred that the display be disposed in each of left and right edge areas of the laminated glass.

According to another mode of the present invention, the display, which is disposed in each of left and right edge areas of the laminated glass, may substitute for outer rear view mirrors of the vehicle.

According to another mode of the present invention, it is preferred that the at least one display have dimensions of from 80 to 200 mm in length and from 100 to 150 mm in width.

In accordance with this mode of the present invention, a driver can see the displays as outer review mirrors without feeling uncomfortable since the displays have dimensions corresponding to those of the normal outer rear view mirrors when seen by him or her.

According to another mode of the present invention, it is preferred that the at least one display be disposed at a central position in a top edge area or a bottom edge area of the windshield glass.

In accordance with this mode of the present invention, the at least one display, which is disposed at a central position of a top edge area or a bottom edge area of the windshield glass, may substitute for the inner rear view mirror of the vehicle.

According to another mode of the present invention, it is preferred that the at least one display have dimensions of from 70 to 150 mm in length and from 150 to 350 mm in width.

In accordance with this mode of the present invention, a driver can see the display as an inner review mirror without feeling uncomfortable since the display has dimensions corresponding to those of the normal inner rear view mirrors.

According to another mode of the present invention, it is preferred that the at least one display be a flat panel display.

In accordance with this mode of the present invention, a thin flat panel display, such as a liquid crystal display, a display utilizing organic light-emitting diodes (organic electro-luminescent display: organic EL display), can be utilized as the display to reduce the thickness of the laminated glass.

According to another mode of the present invention, it is preferred that the at least one display be interposed between at least two interlayers interposed between the at least two glass plates.

In accordance with this mode of the present invention, the at least one display can be interposed between the at least two interlayers to have a screen side as the front side and the rear side protected by the interlayers.

According to another mode of the present invention, it is preferred that the at least one display be disposed on a car-interior side of an optically shielding layer disposed in the peripheral edge area of the laminated glass.

In accordance with this mode of the present invention, the at least one display can be disposed on the car-interior side of the optically shielding layer to keep the appearance design of the windshield glass excellent since the at least one display is concealed by the optically shielding layer so as not to be seen from a car-exterior side.

According to the present invention, there is also provided a display device for a vehicle, which includes the above-mentioned laminated glass according to the present invention, an image sensor capturing an image showing a scene behind a vehicle, and an image processor displaying the image showing the scene behind the vehicle on the display disposed in the laminated glass, the image being captured by the image sensor. The display device for a vehicle according to this mode includes an image capture and display unit having the image sensor and the image processor.

The display device for a vehicle according to another mode of the present invention is preferred to include the above-mentioned laminated glass according to the present invention, the image sensor capturing images showing scenes on lateral sides behind the vehicle, and the image processor displaying an image showing a scene on a right side behind the vehicle, on a first display disposed in a right vertical edge area of the laminated glass and an image showing a scene on a left side behind the vehicle, on a second display disposed in a left vertical edge area of the laminated glass, both of the images being captured by the image sensor.

In accordance with the display device for a vehicle according to this mode, the image sensor captures images showing scenes on lateral sides behind the vehicle, the image processor applies image processing to image signals output from the image sensor, and the display displays the processed images. In this case, the image processor displays, on the first display, the image showing a scene on a right side behind the vehicle while displaying, on the second display, the image showing a scene on a left side behind the vehicle. Thus, the first and second displays work as outer rear view mirrors.

In the display device for a vehicle according to this mode of the present invention, it is preferred that the display device include the above-mentioned laminated glass according to the present invention, the image sensor capturing an image showing a central scene behind the vehicle, and the image processor displaying the image showing the central scene behind the vehicle on the display disposed at a central position in a top edge area or bottom edge area of the laminated glass, the image being captured by the image sensor.

In the display device for a vehicle according to this preferred mode, the image sensor captures an image showing a central scene behind the vehicle, and the image processor applies image processing to an image signal output from the image sensor. The image is displayed on the display disposed at the central position in the top edge area or bottom edge area of the laminated glass. Thus, the display works as an inner rear view mirror.

Advantageous Effects of Invention

In accordance with the laminated glass, it is possible to provide laminated glass including a display, which is suited to windshield glass for a vehicle, and to utilize the laminated glass with a display device equipped therein, which is suited to a vehicle as described above.

DESCRIPTION OF EMBODIMENTS

Now, preferred embodiments of the laminated glass according to the present invention will be described in reference to the accompanying drawings.

Figure 1:
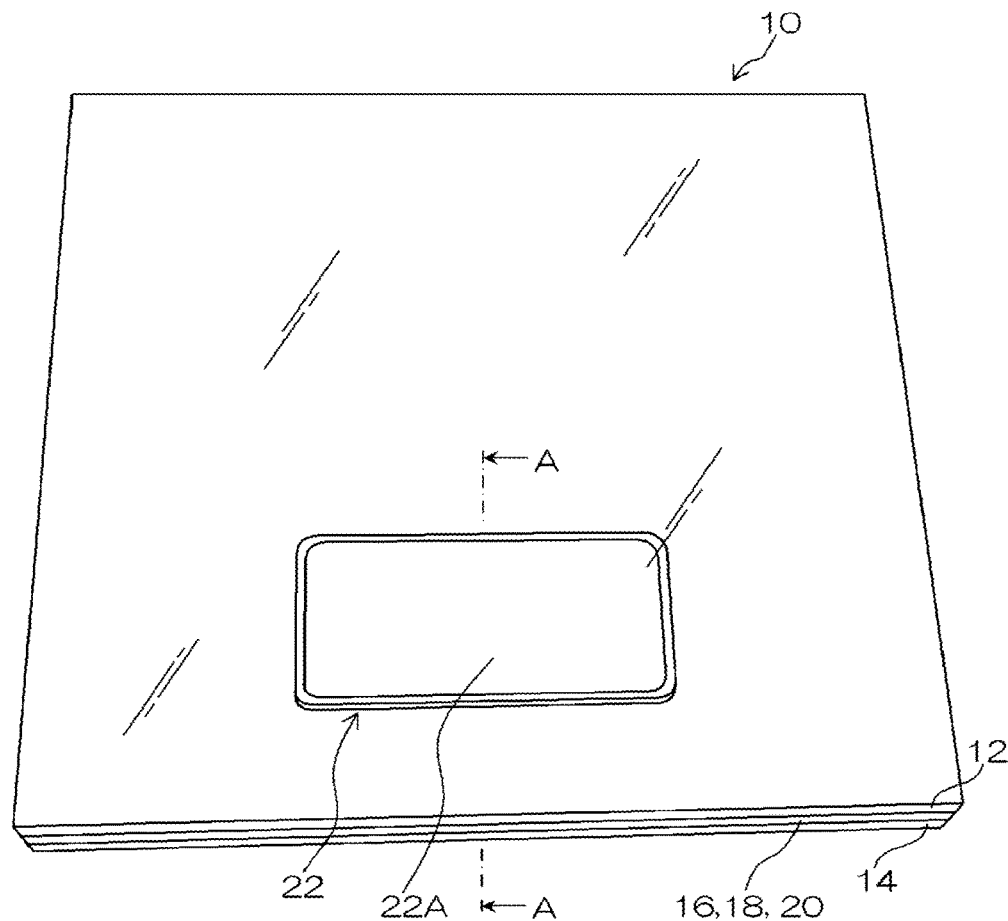
FIG. 1 is a perspective view of laminated glass according to an embodiment for explanation of the laminated glass.
Figure 2:
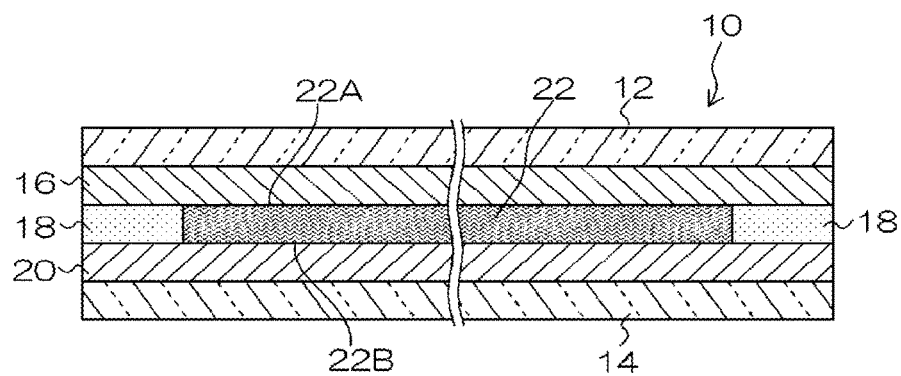
FIG. 2 is a cross-sectional view of the laminated glass taken along line A-A of FIG. 1.

FIG. 1 is a perspective view of the laminated glass 10 according to an embodiment for explanation. FIG. 2 is a cross-sectional view of the laminated glass 10 taken along line A-A of FIG. 1.

<<Structure of Laminated Glass 10>>

The laminated glass 10 is configured by bonding a substantially rectangular glass plate 12 and a substantially rectangular glass plate 14 through substantially rectangular interlayers 16, 18 and 20, both glass plates having the same size as each other. The laminated glass 10 has a display built in a peripheral edge area of the laminated glass 10, the display being formed in a rectangular shape, utilizing organic light-emitting diodes (OLEDs) as one type of the flat panel displays, i.e. an organic electro-luminescence display (hereinbelow, referred to as organic EL display). In other words, the laminated glass 10 is configured by interposing the organic EL display (i.e. display) 22 between an interlayer 16 and an interlayer 20 disposed between the glass plate 12 and the glass plate 14 at a position in the peripheral edge area of the laminated glass. In the shown embodiment, the glass plate 12 is disposed on a car-interior side of a vehicle while the glass plate 14 is disposed on a car-exterior side of the vehicle.

Although the laminated glass 10 according to this embodiment includes the two glass plates 12 and 14, the glass plate is not limited to such structure, and the laminated glass includes more than two glass plates, which are bonded together through one or a plurality of interlayers.

Although the organic EL display 22 is exemplified as the display, the display is not limited to this one. It is preferred from the viewpoint of a reduction in the thickness of the laminated glass 10 that a thin flat panel display, such as a liquid crystal display, be applied to the laminated glass. The organic EL display 22 consumes little power and has a high response speed. The display may be of a transmissive type. Although the display may be built in the laminated glass 10 at at least one position, the display is preferred to be built in the laminated glass at each of a plurality of positions. In the latter case, various kinds of images can be projected on the single laminated glass 10.

It should be noted that the interlayer 18 is an interlayer surrounding the organic EL display 22.

<Interlayers 16, 18 and 20>

Each of the interlayers 16, 18 and 20 is preferably an interlayer made from polyvinyl butyral (hereinbelow, referred to as "PVB-based interlayer") or an interlayer made from an ethylene-vinyl acetate copolymer (hereinbelow, referred to as "EVA-based interlayer"), which is employed in ordinary laminated glass.

It is, however, preferred from the viewpoint of the organic EL display 22 being built in the laminated glass 10 that each of the interlayers be an EVA-based interlayer, which allows the laminated glass 10 to be produced without treatment at a high temperature (temperature using an autoclave). By using such EVA-based interlayers, the glass plate 12, the interlayer 16, the interlayer 18, the organic EL display 22, the interlayer 20 and the glass plate 14 are laminated one after another to form a laminate, the laminate is encapsulated in a vacuum bag, and the laminate is heated to produce the laminated glass 10.

Each of the interlayers 16 and 20 has a thickness of from 0.1 to 1.0 mm as one example. The organic EL display 22 has a thickness of e.g. from 1.3 to 1.7 mm. For this reason, the interlayer 18 is preferred to have a thickness equal to the thickness of the organic EL display 22. Thus, the laminated glass 10 can be configured so as to have a uniform thickness.

<<Features of Laminated Glass 10>>

In accordance with the laminated glass 10, the organic EL display 22 does not protrude from the surface of the laminated glass 10 since the organic EL display 22 is interposed between the glass plate 12 and the glass plate 14. For this reason, when the laminated glass 10 is utilized as windshield glass for a vehicle, such as an automobile, the organic EL display 22 does not serve as a disturbance to a driver or a passenger.

Thus, the laminated glass 10 serves as laminated glass with the organic EL display 22 equipped therein, which is appropriate to windshield glass for a vehicle. Since the organic EL display 22 is interposed between the two glass plates 12 and 14 forming the laminated glass 10, the organic EL display will not come off, and there will be no risk of failure caused by the coming-off.

The organic EL display 22 has a screen surface 22A and a rear surface 22B protected by the interlayer 16 and the interlayer 20, respectively, because of being interposed between the interlayer 16 and the interlayer 20, each of which may be made of one or a plurality of interlayers. The measures for transmitting an image signal to the organic EL display 22 may be wired or wireless. When the measures is wired, the wiring is partly interposed between the interlayers 16 and 20. The measures for supplying a driving power to the organic EL display 22 may be wired or wireless like electromagnetic induction. When the measures is wired, the wiring may be partly interposed between the interlayers 16 and 20.

<<Structure of Laminated Glass 30 According to Another Embodiment>>

Figure 3:
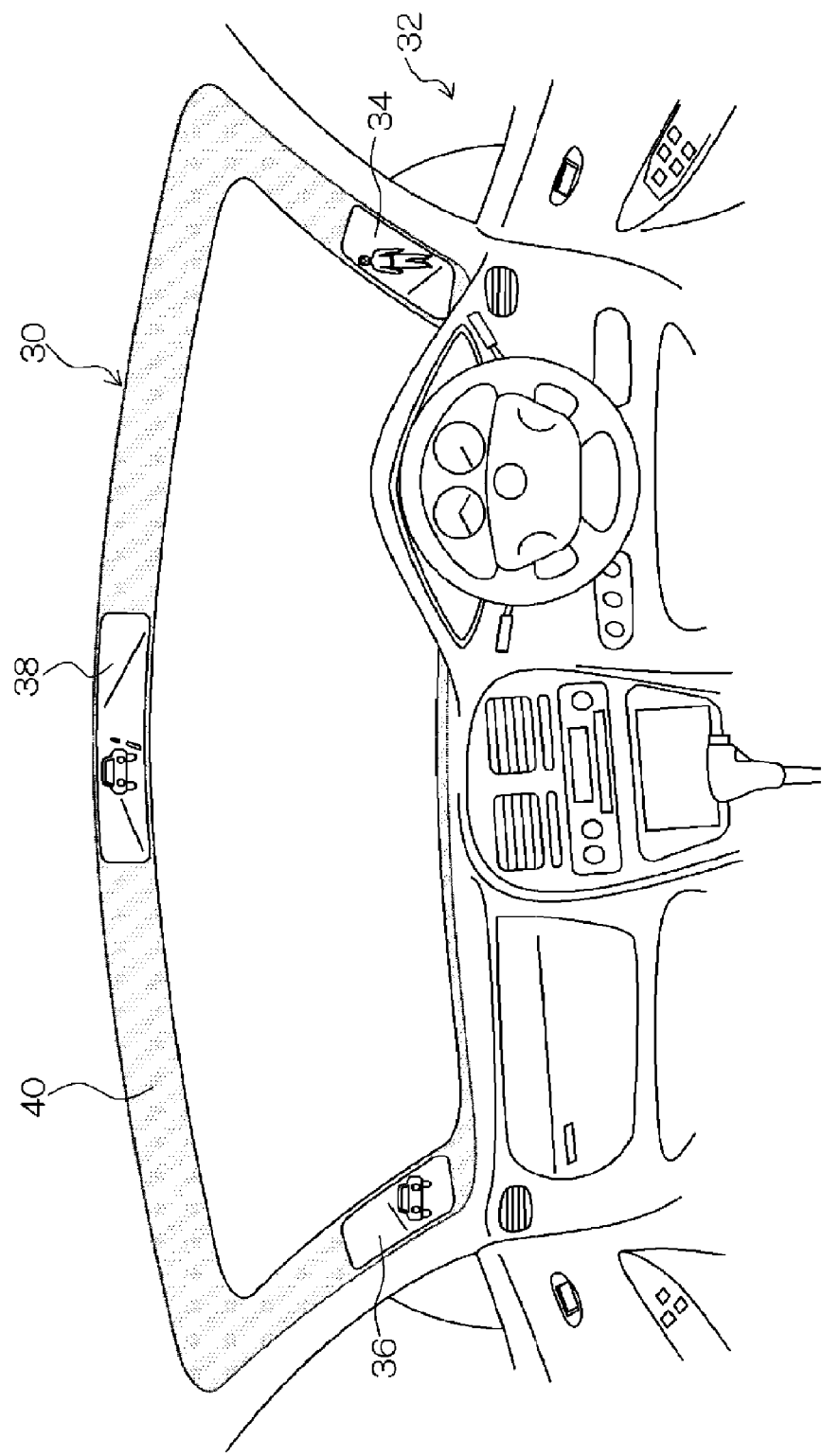
FIG. 3 is a view showing a vehicle windshield window with the laminated glass according to another embodiment mounted thereto and a peripheral area close to the window, seen from a rear position toward a front position in the vehicle.
Figure 4:
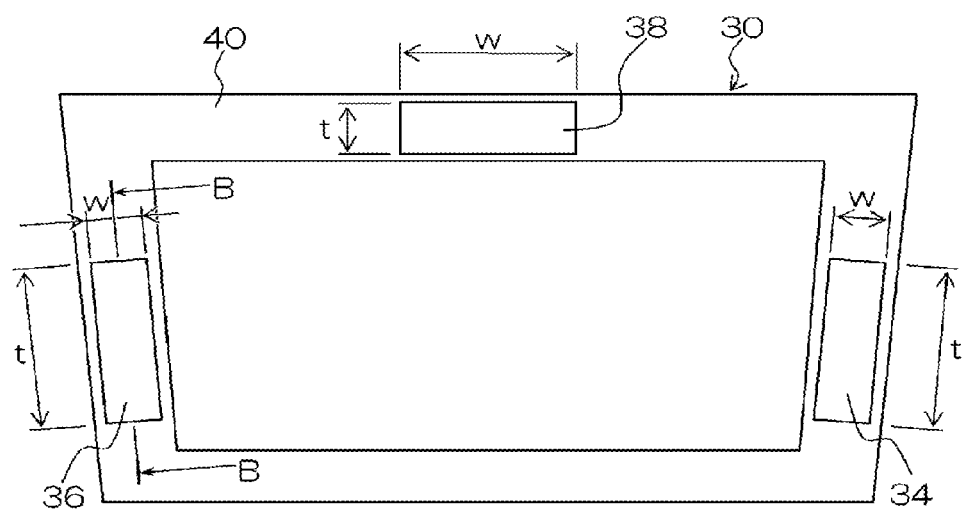
FIG. 4 is a schematic front view of the laminated glass shown in FIG. 3.
Figure 5:
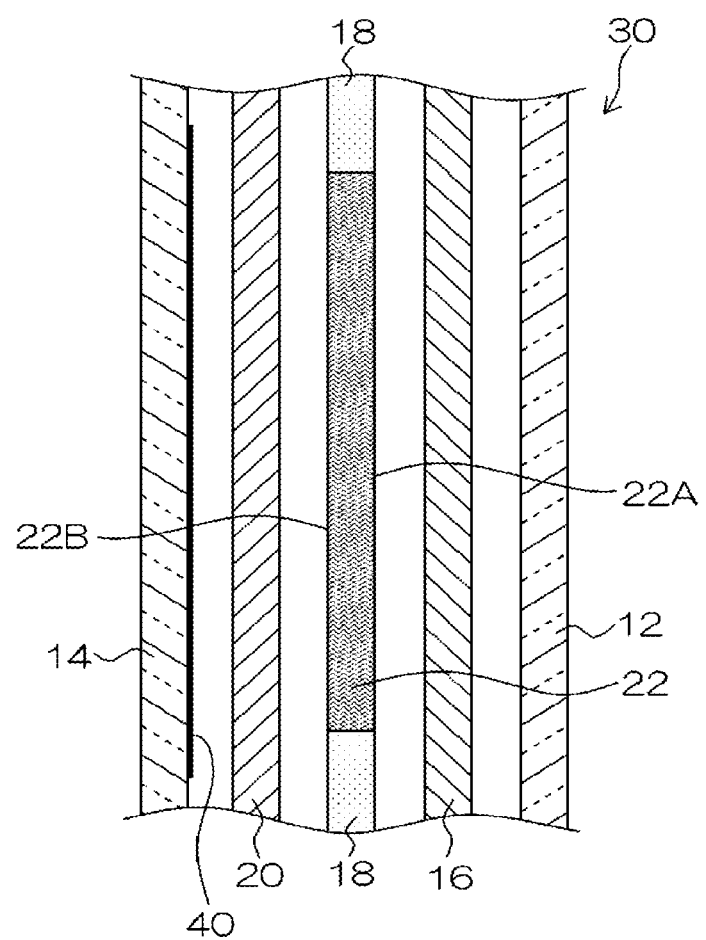
FIG. 5 is a cross-sectional view taken along line B-B of FIG. 4 wherein respective parts of the laminated glass are separated from one another.

FIG. 3 is a view showing a vehicle windshield window (specifically, automobile windshield window) with the laminated glass 30 according to another embodiment mounted thereto and a peripheral area close to the window, seen from a rear position toward a front position in a vehicle 32, wherein the laminated glass is applied to the windshield of the vehicle 32. FIG. 4 is a schematic front view of the laminated glass 30. FIG. 5 is a cross-sectional view taken along line B-B of FIG. 4, wherein respective parts of the laminated glass 30 are separated from one another.

It should be noted that in FIGS. 3 to 5, parts identical to those of the laminated glass 10 shown in FIGS. 1 and 2 are designated by the same reference numerals, and explanation of those parts will be omitted.

As shown in FIG. 3, the laminated glass 30 includes three displays of an organic EL display (first display) 34, an organic EL display (second display) 36 and an organic EL display (third display) 38.

The organic EL display 34 is disposed in a right vertical edge area of the laminated glass in the vicinity of a bottom part thereof, seen from a car-interior side of the vehicle 32, the organic EL display 36 is disposed in a left vertical edge area of the laminated glass in the vicinity of at least a bottom part thereof, seen from the car interior side of the vehicle 32, and the organic EL display 38 is disposed at a central position in a top edge area of the laminated glass, seen from the car-interior side of the vehicle 32.

By disposing the organic EL displays 34, 36 and 38 as described above, the organic EL displays 34 and 36 can substitute for the outer rear view mirrors of the vehicle 32 while the organic EL display 38 can substitute for the inner rear view mirror of the vehicle.

It should be noted that the position of the organic EL display 38 is not limited to the above-mentioned central position in the top edge area, and that the organic EL display 38 may be disposed on a right side in the top edge area or on a left side in the top edge area, seen from the car-interior side of the vehicle 32 or may be disposed at a central position in a bottom edge area, on a right side in the bottom edge area or on a left side in the bottom edge area, seen from the car-interior side of the vehicle 32. Although the number of the organic EL displays disposed in the laminated glass 30 is not limited to three, three organic EL displays are preferred to be disposed at the positions of the organic EL displays 34, 36 and 38 shown in FIG. 3.

As shown in FIG. 4, each of the organic EL displays 34 and 36, which are disposed in the right and left vertical edge areas of the laminated glass is preferred to have a length (t) of from 80 to 200 mm, a width (w) of from 100 to 150 mm and a thickness of from 0.1 to 2.3 mm. It should be noted that FIG. 4 does not show dimensions corresponding to the actual dimensions because the dimensions of the organic EL displays 34 and 36 are exaggeratedly shown.

Even when flat panel displays, such as liquid crystal displays other than the organic EL displays, are utilized as the displays, the above-mentioned dimensions are applicable.

When the dimensions are set as described above, the dimensions of the organic EL displays 34 and 36 approximate the dimensions of outer rear view mirrors seen from a driver such that he or she can recognize the organic EL displays 34 and 36 as outer rear view mirrors without feeling uncomfortable.

The organic EL display 38 disposed in the top edge area or the bottom edge area of the laminated glass is preferred to be dimensioned to have a length (t) of from 70 to 150 mm, a width (w) of from 150 to 350 mm and a thickness of from 0.1 to 2.3 mm. It should be noted that FIG. 4 does not show dimensions corresponding to the actual dimensions because the dimensions of the organic EL display 38 are exaggeratedly shown.

Even when a flat panel display, such as a liquid crystal display other than an organic EL display, is utilized, the above-mentioned dimensions are also applicable.

When the dimensions are set as described above, the dimensions of the organic EL display 38 approximates to the dimensions corresponding to an inner rear view mirror such that a driver can recognize the organic EL display 38 as an inner rear view mirror without feeling uncomfortable.

By the way, the organic EL displays 34, 36 and 38 are preferred to be disposed on a car-interior side of an optically shielding layer 40 disposed in the peripheral edge area of the laminated glass 30 as shown in FIGS. 3 to 5 such that the organic EL displays 34, 36 and 38 are concealed by the optically shielding layer 40 when being seen from the car-interior side.

<<Optically Shielding Layer 40>>

In order that a sealing material (not shown), such as a urethane sealant, which retains the laminated glass 30 as windshield glass at the periphery of the laminated glass, is prevented from being degraded by ultraviolet light, the laminated glass 30 has the optically shielding layer 40 so-called "black ceramic" formed in the peripheral edge area.

The optically shielding layer 40 is formed by printing and calcining black or dark black ceramic printing ink on the car-interior side of the glass plate 14 positioned on the car-exterior side of the vehicle in the laminated glass 30 as shown in FIG. 5.

When the organic EL displays 34, 36 and 38 are disposed on the car-interior side of the optically shielding layer 40, the windshield glass can keep excellent appearance since the organic EL displays 34, 36 and 38 are concealed by the optically shielding layer 40 so as to not be seen from a car-exterior side.

Figure 6A:
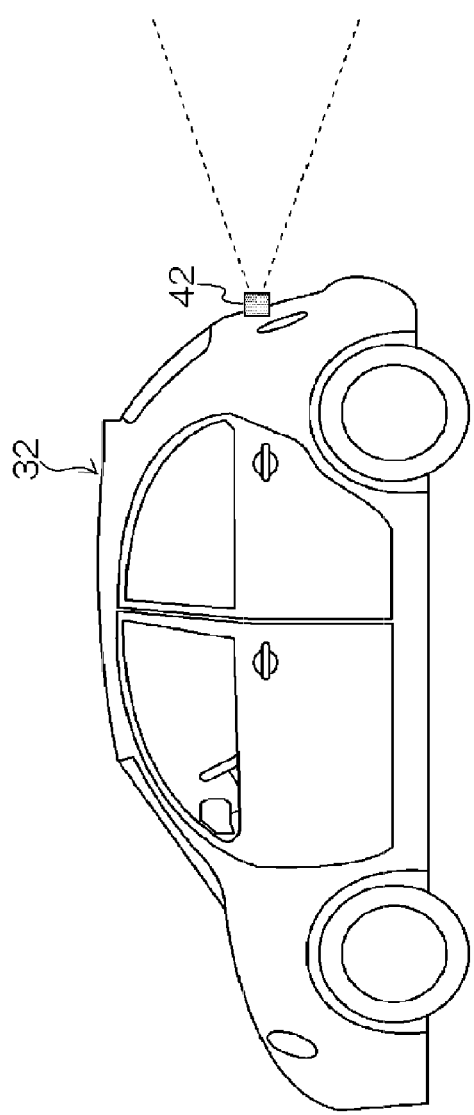
FIGS. 6A and 6B are a left side view and a top plan view of the vehicle, respectively.
Figure 6B:
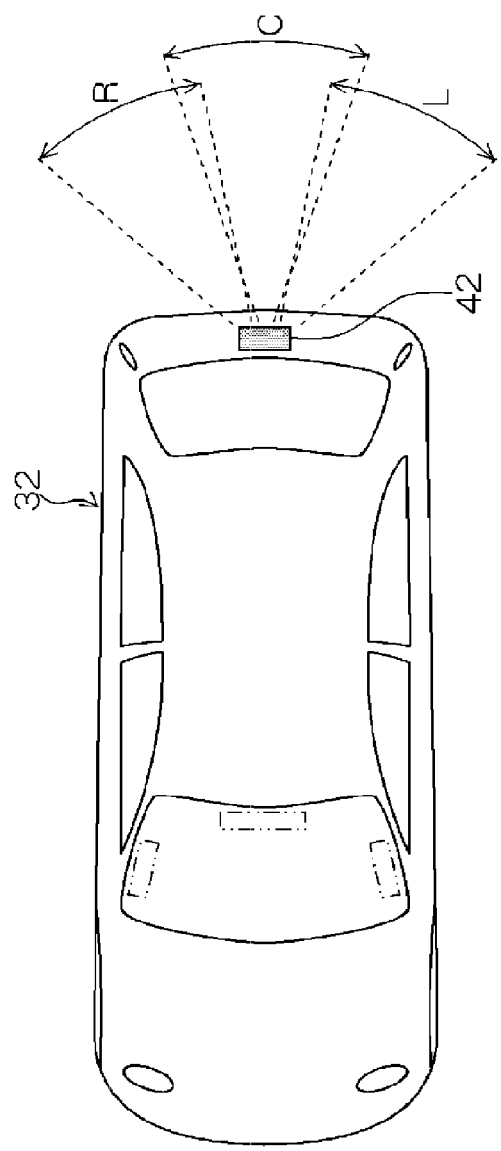
Figure 7:
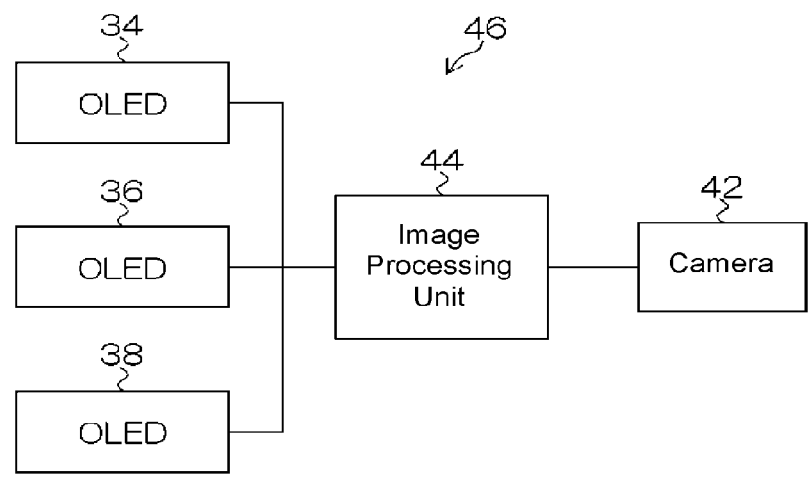
FIG. 7 is a block diagram of an image capture and display unit wherein a camera and an image processor are connected to organic EL displays.

FIGS. 6A and 6B are left side view of the vehicle 32 and a top plan view of the vehicle 32, respectively. FIG. 7 is a block diagram of an image capture and display unit 46 wherein a camera (image sensor) 42 and an image processing unit (image processor) 44 are connected to the organic EL displays 34, 36 and 38.

As shown in FIGS. 6A and 6B, the camera 42 is mounted to a central position of a rear portion of the vehicle 32 so as to capture scenes just behind and on lateral sides behind the vehicle 32. The image processing unit 44 of FIG. 7 is disposed in, e.g. a trunk of the vehicle 32. The image processing unit 44 works such that an image showing a scene on a right side behind the vehicle 32 (image on an area R shown in FIG. 6B) is displayed on the organic EL display 34 (first display), an image showing a scene on a left side behind the vehicle 32 (image on an area L shown in FIG. 6B) is shown on the organic EL display 36 (second display), and an image on a central scene behind the vehicle 32 (image on an area C shown in FIG. 6B) is displayed on the organic EL display 38 (third display), these images being captured by the camera 42.

In other words, according to the image capture and display unit 46 shown in FIG. 7, the organic EL displays 34 and 36 work as outer rear view mirrors while the organic EL display 38 works as an inner rear view mirror. It should be noted that each of the right side behind the vehicle and the left side behind the vehicle are named based on a direction seen from a driver sitting on the driver's seat, and the central scene behind the vehicle is named based on the direction seen from the driver sitting in the driver's seat.

Figure 8:
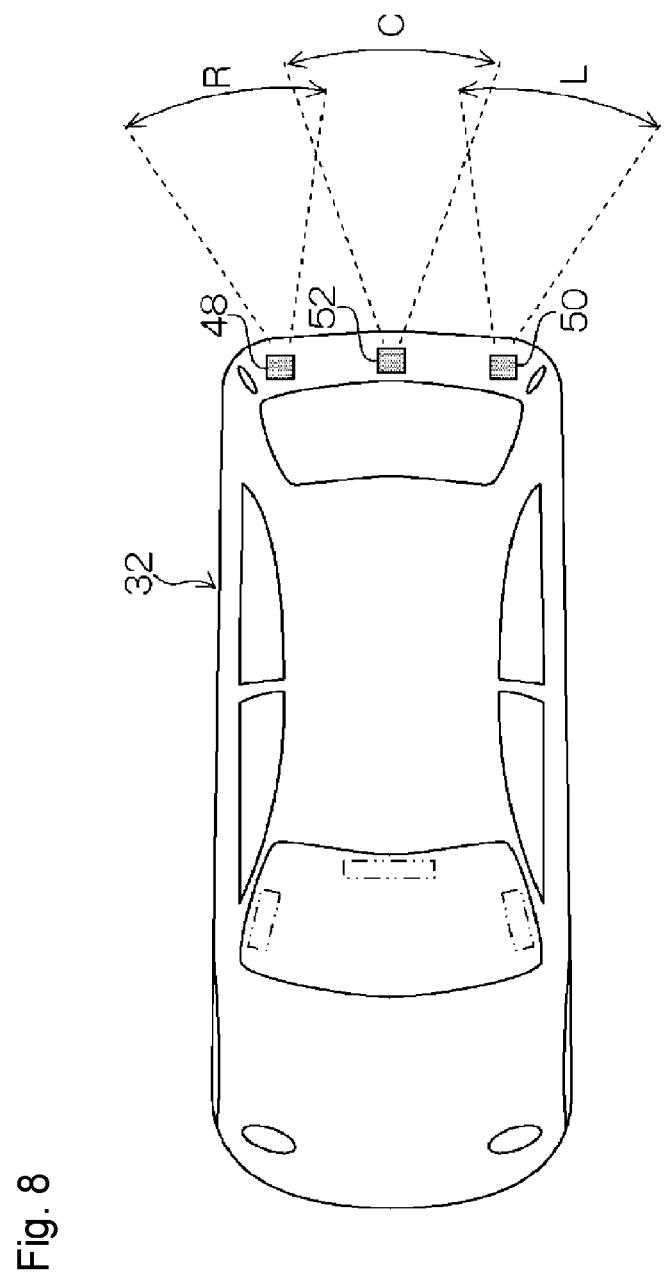
FIG. 8 is a top plan view of a vehicle having three cameras.

Although FIGS. 6A and B show a mode where the single camera 42 captures images on scenes behind the vehicle, three cameras 48, 50 and 52 may be mounted on the rear portion of the vehicle 32 as shown as a top plan view of the vehicle 32 in FIG. 8.

Specifically, the camera 48, which is provided on a right rear portion of the vehicle 32, seen from behind the vehicle 32, captures an image on a scene in an area R, and the image is displayed on the organic EL display 34 (first display). The camera 50, which is mounted on a left rear portion of the vehicle 32, captures an image on a scene in an area L, and the image is displayed on the organic EL display 36 (second display). The camera 52, which is mounted on a central rear portion of the vehicle 32, captures an image on a scene in an area C, and the image is displayed on the organic EL display 38 (third display). By disposing the three cameras as described above, it is possible to have a wider imaging range such that the image processing unit 44 extracts a desired image among these images and displays the extracted image on a relevant organic EL display. Further, the imaging range can be widen to display images on scenes in lateral directions of the vehicle 32 as well.

INDUSTRIAL APPLICABILITY

The laminated glass according to the present invention can be appropriately utilized as windshield glass for a vehicle or an image display part for a vehicle display device since the display or displays are built in the laminated glass such that the display or displays do not protrude from the surface of the laminated glass. The display of the laminated glass according to the present invention is useful because of being utilized as an outer rear view mirror or an inner rear view mirror for a vehicle.

Although the above-mentioned embodiments have been described about a case where the laminated glass according to the present invention is applied to windshield glass for a vehicle, the laminated glass is not limited to such a case.

This application is a continuation of PCT Application No. PCT/JP2014/073829, filed on Sep. 9, 2014, which is based upon and claims the benefit of priority from Japanese Patent Application No. 2013-192768 filed on Sep. 18, 2013. The contents of those applications are incorporated herein by reference in their entireties.

REFERENCE SYMBOLS

10: laminated glass, 12 and 14: glass plate, 16, 18 and 20: interlayer, 22: organic EL display, 30: laminated glass, 32: vehicle, 34, 36 and 38: organic EL display, 40: optically shielding layer, 42: camera, 44: image processing unit, 46: image capture and display unit, 48, 50 and 52: camera

What is claimed is:

1. A laminated glass utilized as windshield glass for a vehicle, comprising:
   at least two glass plates and an interlayer interposed there between;
   at least one display interposed between the at least two glass plates; and
      wherein the at least one display is disposed in a peripheral edge area of the laminated glass as seen from the interior of the car,
      wherein the interlayer comprises three layers the middle layer of which surrounds the display,
      wherein the at least one display comprises a flat panel display, and
      wherein the at least one display is disposed on a car-interior side of an optically shielding layer disposed on the peripheral edge area of the laminated glass and wherein the optical shielding layer is black ceramic.

2. The laminated glass according to claim 1, wherein the display is disposed in each of left and right vertical edge areas of the laminated glass.

3. The laminated glass according to claim 2, wherein the at least one display has dimensions of from 80 to 200 mm in length and from 100 to 150 mm in width.

4. The laminated glass according to claim 1, wherein the at least one display is disposed at a central position in a top edge area or a bottom edge area of the windshield glass.

5. The laminated glass according to claim 4, wherein the at least one display has dimensions of from 70 to 150 mm in length and from 150 to 350 mm in width.

6. A display device for a vehicle, comprising:
   the laminated glass defined in claim 1;
   an image sensor capturing an image showing a scene behind the vehicle; and
   an image processor displaying the image showing the scene behind the vehicle on the display disposed in the laminated glass, the image being captured by the image sensor.

7. The display device according to claim 6, wherein:
   the image sensor captures images showing scenes on lateral sides behind the vehicle; and
   the image processor displays an image showing a scene on a right side behind the vehicle on a first display disposed in a right vertical edge area of the laminated glass, and an image showing a scene on a left side behind the vehicle on a second display disposed in a left vertical edge area of the laminated glass, both of the images being captured by the image sensor.

8. The display device according to claim 6, wherein:
   the image sensor captures an image showing a central scene behind the vehicle; and
   the image processor displays the image showing the central scene behind the vehicle on the display disposed at a central position in a top edge area or bottom edge area of the laminated glass, the image being captured by the image sensor.

9. The display device according to claim 1, wherein the flat panel display is a liquid crystal display.

10. The display device according to claim 1, wherein the flat panel display is an organic electro-luminescent display.

11. The display device according to claim 10, wherein the flat panel display is a transmissive type of organic electro-luminescent display.

12. The display device according to claim 1, wherein the interlayer is made from an ethylene-vinyl acetate copolymer.

13. The display device according to claim 1, wherein the middle layer has a thickness equal to the thickness of the display.

* * * * *